United States Patent [19]

Chopp, Jr. et al.

[11] 4,399,592
[45] Aug. 23, 1983

[54] METAL TIE

[75] Inventors: Joseph A. Chopp, Jr., New Lenox; Larry S. Mohr, Tinley Park, both of Ill.

[73] Assignee: Panduit Corp., Tinley Park, Ill.

[21] Appl. No.: 213,808

[22] Filed: Dec. 8, 1980

[51] Int. Cl.³ .................... B65D 63/08; F16L 33/00
[52] U.S. Cl. ........................................ 24/25; 24/244
[58] Field of Search ............... 24/16 PB, 20 R, 24, 24/25, 115 L, 136 A, 244

[56] References Cited

U.S. PATENT DOCUMENTS

| | | |
|---|---|---|
| 25,125 | 8/1859 | Knowles . |
| 28,187 | 5/1860 | Loughborough . |
| 204,965 | 6/1878 | Gilman . |
| 205,720 | 7/1878 | Blossom ................................. 24/25 |
| 225,517 | 3/1880 | Gilman . |
| 296,686 | 4/1884 | Gresham ................................ 24/25 |
| 331,088 | 11/1885 | Sackett ................................ 24/244 |
| 980,700 | 1/1911 | Swafford ................................ 24/25 |
| 2,491,290 | 12/1949 | Tinnerman ................... 24/16 PB X |
| 3,086,267 | 4/1963 | Mathes ................................ 24/117 |
| 3,434,686 | 3/1969 | Yoshizaboroaoi ............... 24/244 X |
| 4,085,848 | 4/1978 | Tsuge ................................ 24/244 X |

FOREIGN PATENT DOCUMENTS 312969 1/1914 Fed. Rep. of Germany ... 24/136 A
89366 4/1957 Norway .................................. 24/25

Primary Examiner—Francis K. Zugel
Assistant Examiner—Peter A. Aschenbrenner
Attorney, Agent, or Firm—Charles R. Wentzel; Mark D. Hilliard

[57] ABSTRACT

A tie for forming a plurality of objects into a bundle and for holding a pair of objects together comprising an elongate metallic strap, a metallic locking head disposed adjacent one end of the strap for receiving the other end of the strap and metallic roller means captively held within the head for lockingly engaging the strap. The head includes a strap entry face, a strap exit face and a strap-receiving aperture extending between the faces. The head further comprises a floor and a roof diverging in the direction of the exit face. The roller means is movable between a threading position in which it is disposed adjacent the exit face and a locking position wherein the roller means is closer the entry face. The tie further includes strap deflection means functioning along with the roller means to effect a bend in the threaded portion of the strap whereby the threaded strap is maintained in engagement with the roller means without regard to the orientation of the head.

11 Claims, 8 Drawing Figures

METAL TIE

BACKGROUND OF THE INVENTION

The present invention relates generally to bundling and attachment devices and more specifically to a tie for forming a plurality of elongate objects into a bundle and for holding a pair of objects together.

Plastic cable ties have become increasingly popular for a variety of bundling and attachment applications because of their relatively low initial cost and their ease of installation. For certain applications, however, it is more desirable to use a metallic tie. More specifically, plastic straps tend to become brittle when used at low temperature and have less desirable aging characteristics than comparable metal straps; e.g., when used in a high temperature, high humidity environment, plastic ties may undergo some elongation. Metal ties are also often preferably for underground installation and for use in corrosive environments. Additionally, plastic ties are inappropriate for certain nuclear powerplant applications since radiation can result in degradation of the plastic material thereby rendering the strap more brittle. Also, where it is desired to use the tie as a load carrying member, the metal tie is often preferable since it has much greater tensile strength.

Several self-locking bundling devices formed from metal have been proposed. In one type a plurality of regularly spaced vanes extend at an angle from the strap surface. During application, portions of the strap must be overlapped so that the vanes interleave. It will be appreciated that overlapping requires the use of a somewhat longer strap and metallic vanes extending from the strap could damage the insulation of wires in adjacent bundles. In another type of metallic tie the strap portion has a series of abutments which sequentially deflect a tongue in the locking head of the tie during threading. Examples of such ties are disclosed in U.S. Pat. Nos. 3,311,957, 3,694,863 and 3,964,133.

In one prior art bundling device a roller pin is used to wedge the strap against components of the locking head. Such a tie was relatively time consuming in use because it included several loose parts which required careful manual assembly. Additionally, it was possible to inadvertently release the strap because portions of the pin extended beyond the locking head. Reference may be made to U.S. Pat. No. 2,491,290.

In the nineteenth century metallic bundling devices incorporating locking balls were used for bundling bales of cotton or the like. Such devices had the disadvantage that they were not positively locking. That is, depending on the orientation of the locking head, gravity could hold the ball out of engagement with the locking ball resulting in release of the tightened strap. See, for example, U.S. Pat. Nos. 28,197 and 225,517.

SUMMARY OF THE INVENTION

Among the several objects of the present invention may be noted the provision of an improved self-locking tie for forming elongate objects into a bundle and for holding a pair of objects together; the provision of such tie which locks the tightened threaded strap without regard to the orientation of the locking head; the provision of which makes it satisfactory for use in high temperature, low temperature and other harsh environments; the provision of such tie which requires low threading force and which permits tightening without damaging the held objects; and the provision of such tie which has high tensile strength, is lightweight, has long service life and is simple and economical to manufacture. Other objects and features of the present invention will be in part apparent and in part pointed out hereinafter in the specification and claims attendant thereto.

Briefly, the tie of the present invention comprises a metallic strap one end of which is joined to a metallic locking head which receives the other end of the strap and metallic roller means captively held in the head for lockingly engaging the strap. The head includes an entry face, an exit face and a strap-receiving aperture extended therebetween, and further includes a floor and a roof diverging in the direction of the exit face. The roller means is shiftable between a threading portion wherein it is disposed adjacent the exit face and a locking position wherein the roller means is closer the entry face. The tie further comprises strap deflection means for effecting a bend in the threaded portion of the strap so that the tie is positioned lockingly.

BRIEF DESCRIPTION OF THE DRAWINGS

Corresponding reference characters indicate corresponding components of the present invention throughout the several views of the drawings.

DESCRIPTION OF THE PREFERRED EMBODIMENT

Figure 1:
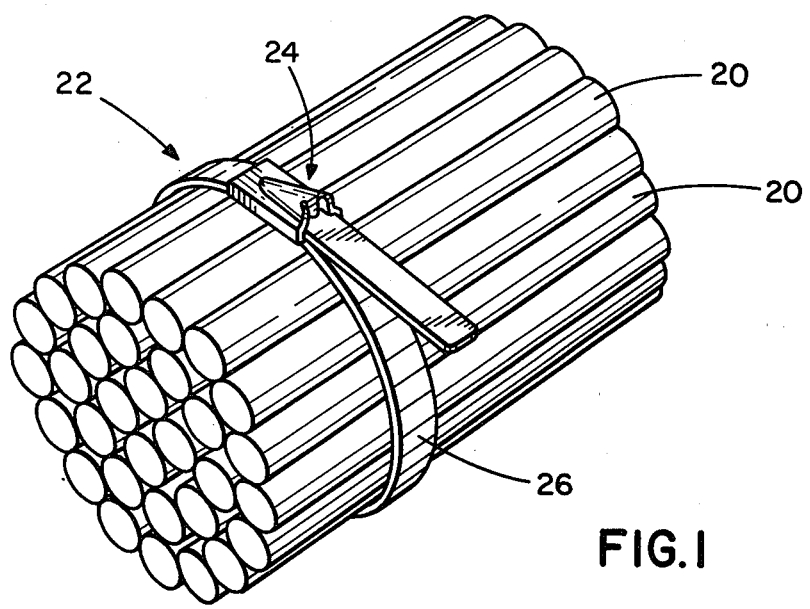
FIG. 1 is a perspective view of the metal tie of the present invention, comprising a locking head, a locking ball and a strap extending from the head, forming wires into a bundle.

Referring now to the drawings, a cable tie for forming a plurality of elongate objects, such as wires 20, and for holding a pair of objects together is generally indicated in FIG. 1 by reference character 22. Tie 22 includes a locking head 24, an elongate strap 26 extending from the strap, and roller means in the form of a ball or sphere 28, best shown in FIGS. 7 and 8, for retaining the strap within the locking head. Preferably the ball, head and strap are formed of stainless steel to allow the strap to be used over a wide temperature range and to give the tie high strength and excellent resistance to corrosion.

Figure 2:
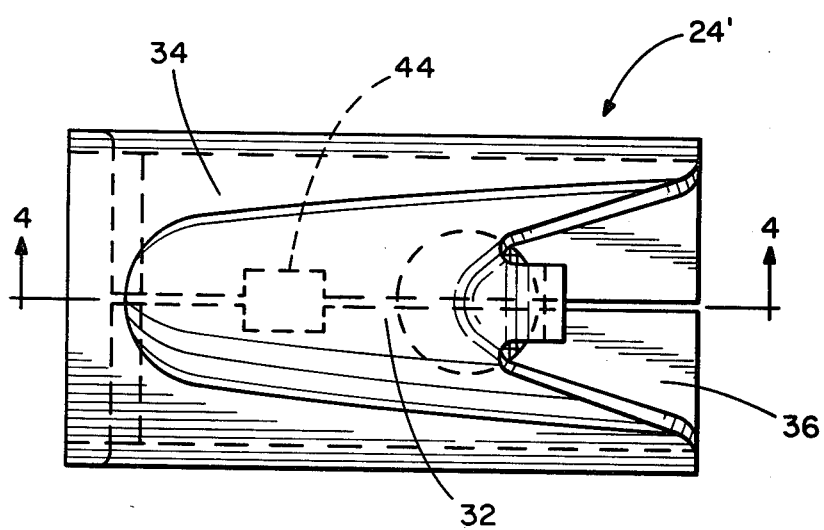
FIGS. 2 and 3 are, respectively, plan and side views of the partial locking head prior to attachment to the strap.
Figure 4:
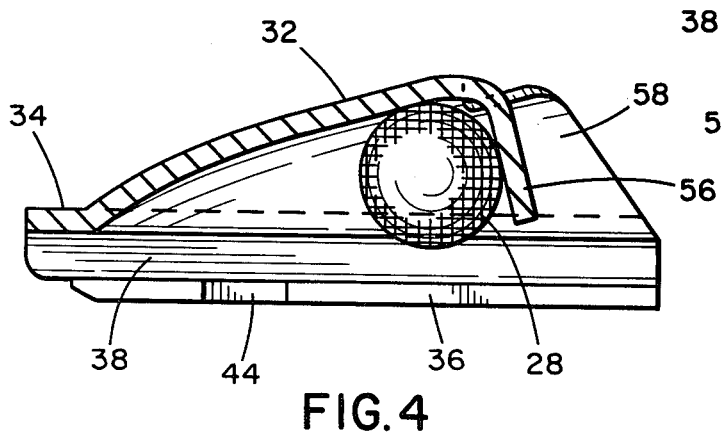
FIG. 4 is a sectional view of the partial locking head taken generally along line 4—4 of FIG. 2.
Figure 3:
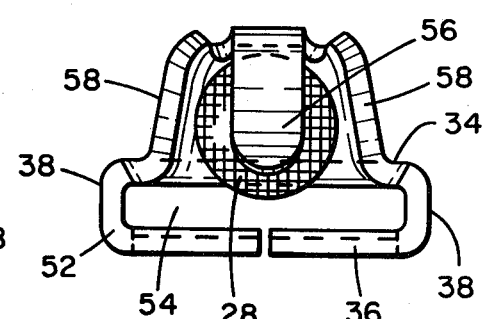
Figure 5:
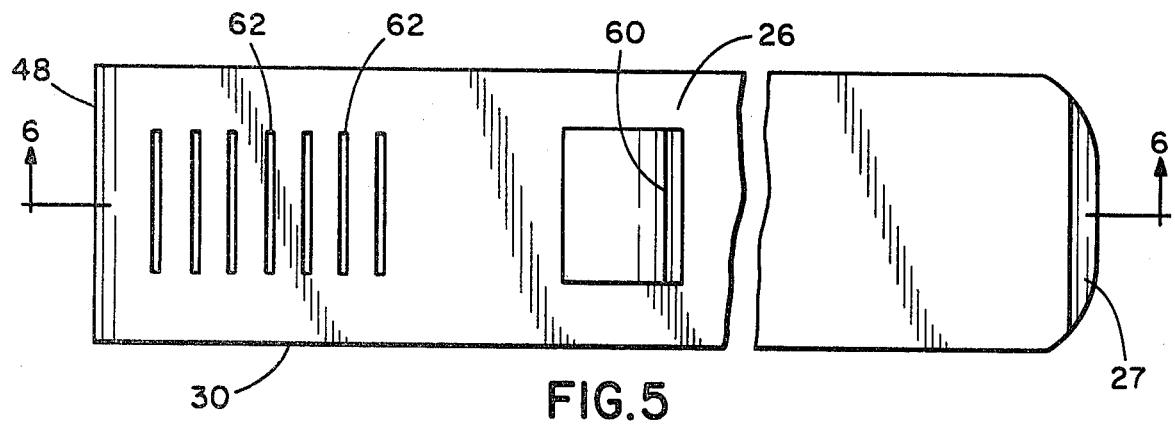
FIG. 5 is a plan view of the strap and a hooked portion integral therewith for holding the partial locking head.
Figure 6:
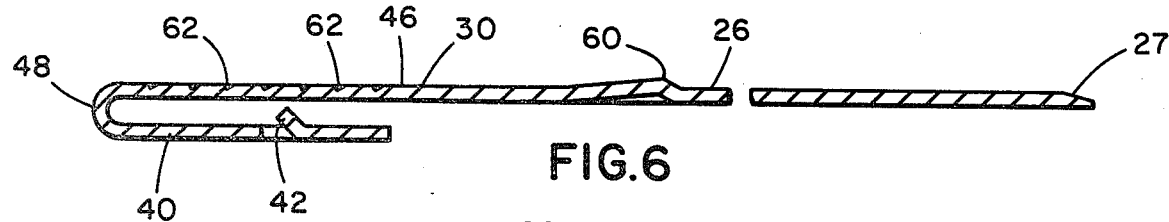
FIG. 6 is a sectional view of the strap and hooked portion taken generally along line 6—6 of FIG. 5.

The tie of the present invention is formed by assembling a partial locking head 24', shown in FIGS. 2-4, and the strap 26 and a hooked portion 30 formed integral with the strap as shown in FIGS. 5 and 6. After assembly, the hooked portion is a component on the completed locking head 24. Referring to FIGS. 2-4, partial locking head 24' comprises a roof 32, a ceiling 34 and a bottom wall 36 with the ceiling and bottom wall joined by a pair of sidewalls 38. Hooked portion 30 includes a distal end 40 having a resilient latching finger 42 for reception in a window 44 formed in bottom wall 36. Thus finger 42 and window 44 constitute latching means for holding the head and hooked portion together. Hooked portion 30 also comprises a floor 46 of the assembled locking head 24 with floor 46 and distal end 40 extending generally parallel to one another, joined by a bight 48 and spaced sufficiently to receive the bottom wall 36 therebetween. Strap 26 is provided with a tapered tip 27 to facilitate threading into the locking head.

Figure 7:
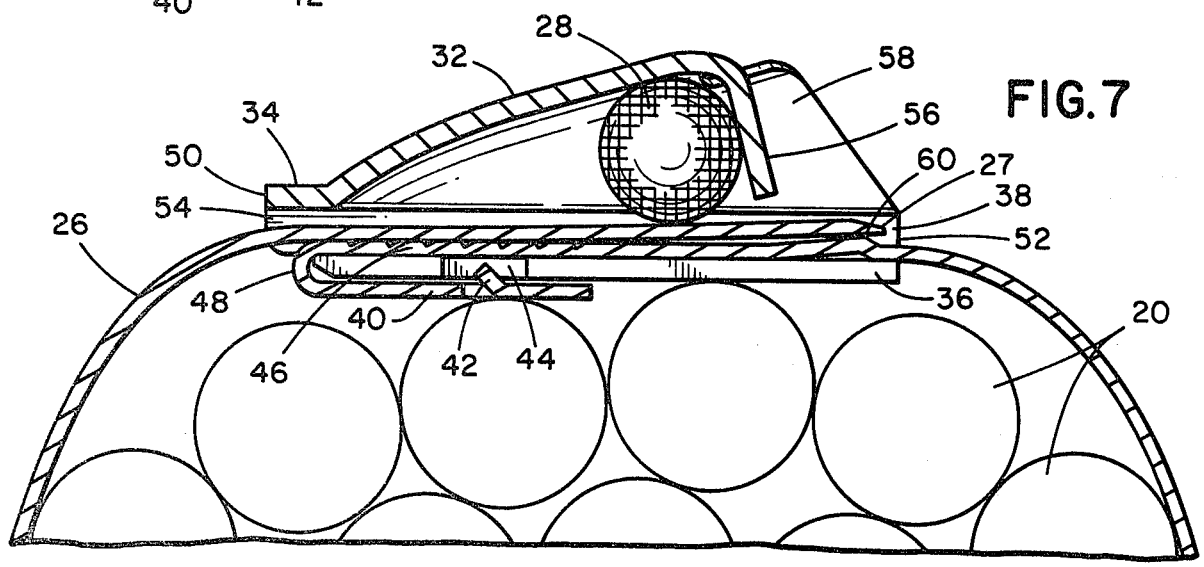
FIG. 7 is a sectional view showing the strap threaded into the locking head with the locking ball in its threading position.
Figure 8:
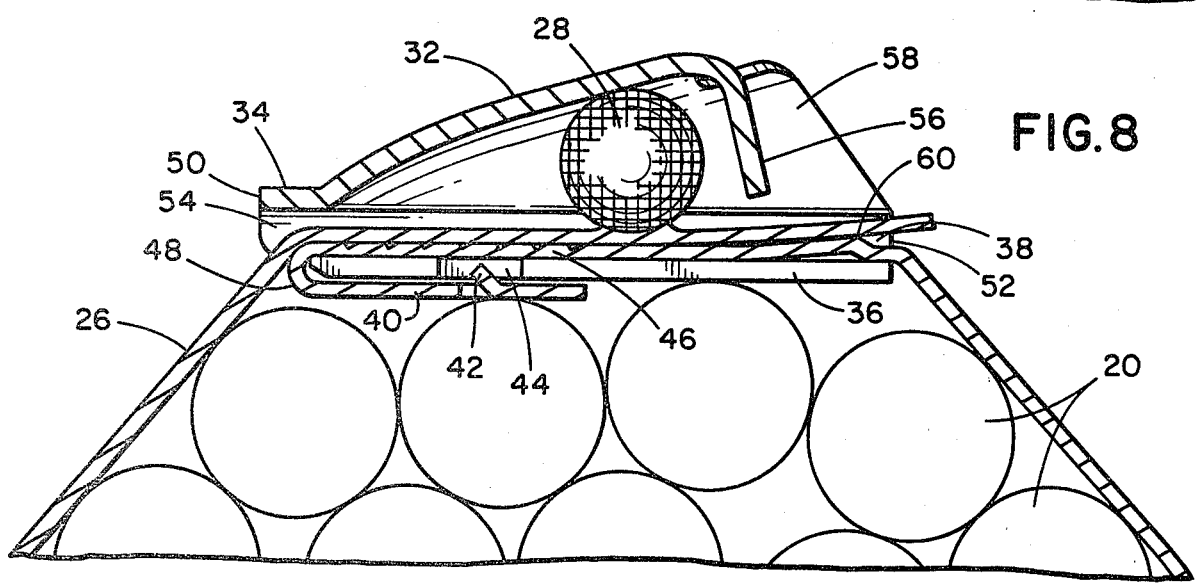
FIG. 8, similar to FIG. 7, depicts the locking ball in its locking position.

As shown in FIGS. 7 and 8, locking head 24 includes a strap entry face 50, a strap exit face 52 and a strap-receiving aperture 54 extending therebetween. Roof 32 and floor 46 diverge in the direction of exit face 52. Ball 28, which has a textured or roughened surface to increase its coefficient of friction with the strap, is captively held between the roof and floor by retention means comprising a finger 56 extending from the roof toward the floor adjacent exit face 52. One end of roof 32 joins ceiling 34 adjacent entry face 50 with spaced side wings 58 joining other parts of the roof and ceiling. Portions of side wings 58 adjacent exit face 52 serve as a reaction surface for the nose of a strap tightening tool of the general type shown in commonly assigned U.S. Pat. Nos. 4,128,919 and 3,661,187.

Locking ball 28 is movable between a threading position, shown in FIG. 7, wherein ball 28 is disposed engaging finger 56 adjacent exit face 52 and a locking position, shown in FIG. 8, wherein the ball is closer entry face 50 and securely engages the threaded strap. It is noted that with ball 28 in its threading position and concurrently engaging finger 56 and roof 32, the spacing between ball 28 and floor 46 is greater than the thickness of the strap. To insure that the locking ball is in continuous engagement with the threaded strap without regard to the position of the ball or the orientation of the locking head, tie 22 comprises deflection means functioning along with ball 28 to effect a bend in the threaded portion of the strap.

The deflection means comprises a raised portion or protuberance 60 for deflecting the threaded strap away from floor 46 as the threaded strap exits the locking head. Protuberance 60 is disposed adjacent strap exit face 52 either extending from floor 46, as is shown in the drawings, or extending from the strap. As shown in FIG. 7, as the strap is threaded through the locking head it is engaged at three spaced locations causing the strap to bend and remain in engagement with the locking ball 28. More specifically, the strap is engaged by floor 46 adjacent strap entry face 50, by locking ball 28 and by protuberance 60. Preferably, floor 46 has a series of regularly spaced transverse grooves 62 of triangular configuration for biting into the locked strap to further resist the application of strap withdrawal force. Also preferably the roof and floor diverge at approximately ten degrees.

Operation of tie 22 is as follows: After strap 26 is deformed to encompass the objects to be held, tip 27 is inserted into locking head 24. Continued threading of the strap causes the strap to bend resulting in positive locking of the strap and ball no matter at what angle the head is held. Release of the tightened strap causes the locking ball to move to its locking position, shown in FIG. 8, where the strap is compressively held between the ball and the floor resulting in the ball indenting the threaded strap. It will be appreciated that if the tie bundles resilient objects such as wires and the excess portion of the threaded strap is severed adjacent the strap exit face by a strap tightening tool, the severed end of the strap will withdraw slightly inside the locking head to avoid exposed sharp edges. Also it should be appreciated that no portion of the locking means extends from the locking head. In certain prior art roller locking straps, a portion of the roller locking means extended from the head where it might be inadvertently engaged causing movement of the roller locking means resulting in release or loosening of the strap.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A tie for forming a plurality of objects into a bundle and for holding a pair of objects together, said tie comprising:
   at least one elongate metallic strap;
   a metallic locking head disposed adjacent one end of a strap for receiving another end of a strap, said head comprising a strap entry face, a strap exit face and a strap-receiving aperture extending between said faces, said head further comprising a floor and a roof which diverge in the direction of said exit face; and
   metallic roller means for lockingly engaging a strap, said head comprising retention means disposed adjacent said exit face for captively holding said roller means within said head, said roller means being movable between a threading position wherein the roller means is disposed adjacent said exit face and engages said retention means and a locking position wherein said roller means is closer said entry face, said tie further comprising strap deflection means functioning along with said roller means in its threading position to effect a bend in the portion of a strap threaded into said head whereby said portion is maintained in engagement with said roller means without regard to the orientation of said head.

2. A tie as set forth in claim 1 wherein said tie comprises a single strap and said strap and head are made of stainless steel and the surface of said roller means is textured.

3. A tie as set forth in claim 1 wherein said roller means is disposed between said deflection means and said strap entry face.

4. A tie as set forth in claim 1 wherein said tie comprises a single strap and said head comprises a bottom wall integral with said roof and wherein a hooked portion extends from and is integral with said strap, said hooked portion comprising said floor and a distal end extending substantially parallel to said floor, said distal end and said floor being joined by a bight and spaced to receive said bottom wall.

5. A tie as set forth in claim 4 wherein said bottom wall and said hooked portion comprise latching means for holding said head and said strap together.

6. A tie as set forth in claim 1 wherein said floor includes a transverse groove for biting into the threaded strap when said roller means is in its locking position.

7. A tie as set forth in claim 1 wherein said roller means comprises a textured ball.

8. A tie as set forth in claim 1 wherein said retention means comprises a finger extending from said roof adjacent said exit face.

9. A tie as set forth in claim 3 wherein said deflection means comprises a raised portion of said floor disposed adjacent said exit face.

10. A tie as set forth in claim 3 wherein said tie comprises a single strap and said deflection means comprises a raised portion of said strap disposed adjacent said exit face.

11. A metallic tie for forming a plurality of objects into a bundle and for holding a pair of objects together, said tie comprising:

an elongate strap;

a locking head at one end of said strap for receiving the other end of said strap, said head comprising a strap entry face, a strap exit face and strap-receiving aperture extending therebetween, said head further comprising a floor and a roof which diverge in the direction of said exit face and retention means disposed adjacent said exit face; and roller means captively retained in said head by said retention means between said roof and floor for lockingly engaging said strap, said roller means being movable between a threading position wherein it is disposed adjacent said exit face in engagement with said retention means and a locking position wherein it is positioned nearer said entry face, said roller means when in its threaded position engaging the threaded portion of said strap and causing, along with other components of said tie, a bend in the threaded portion of said strap whereby in all its positions and without regard to the orientation of said head, said roller means engages the threaded portion of said strap, said tie further including deflection means for deflecting the threaded portion of said strap away from said floor as it exits from said head, said other components of said tie including said deflection means and further including a portion of said floor disposed on the side of said roller means remote from said exit face.

* * * * *